United States Patent [19]

Olin

[11] Patent Number: 4,461,173
[45] Date of Patent: Jul. 24, 1984

[54] MULTIRANGE FLOWMETER

[75] Inventor: John G. Olin, Carmel Valley, Calif.

[73] Assignee: Sierra Instruments, Inc., Carmel Valley, Calif.

[21] Appl. No.: 378,884

[22] Filed: May 17, 1982

[51] Int. Cl.³ .............................................. G01F 5/00
[52] U.S. Cl. .................................................... 73/203
[58] Field of Search ............. 73/202, 203, 204, 861.62

[56] References Cited

U.S. PATENT DOCUMENTS

| 1,681,762 | 8/1928 | Connet | 73/203 |
|---|---|---|---|
| 1,946,275 | 2/1934 | Collins | 73/202 |
| 2,277,760 | 3/1942 | Hoffman et al. | 73/861.62 |
| 2,586,060 | 2/1952 | Kronberger | 73/202 |
| 3,066,530 | 12/1962 | Stenberg | 73/203 |
| 3,321,970 | 5/1967 | Walker, Sr. et al. | 73/861.62 |
| 3,450,164 | 6/1969 | Walker, Jr. | 73/861.62 |
| 4,083,244 | 4/1978 | Agar et al. | 73/204 |

Primary Examiner—Werbert Goldstein
Attorney, Agent, or Firm—Thomas R. Berthold

[57] ABSTRACT

A multi-range gas flowmeter having a primary gas flow passage and a secondary passage which houses the flow measuring device and which is connected to the primary passage at its inlet and outlet ends. A multi-position valve is located in the primary passage between the inlet and outlet ends of the secondary passage to divert all or a portion of the flow to the secondary passage, depending upon the value of the flow rate to be measured.

1 Claim, 1 Drawing Figure

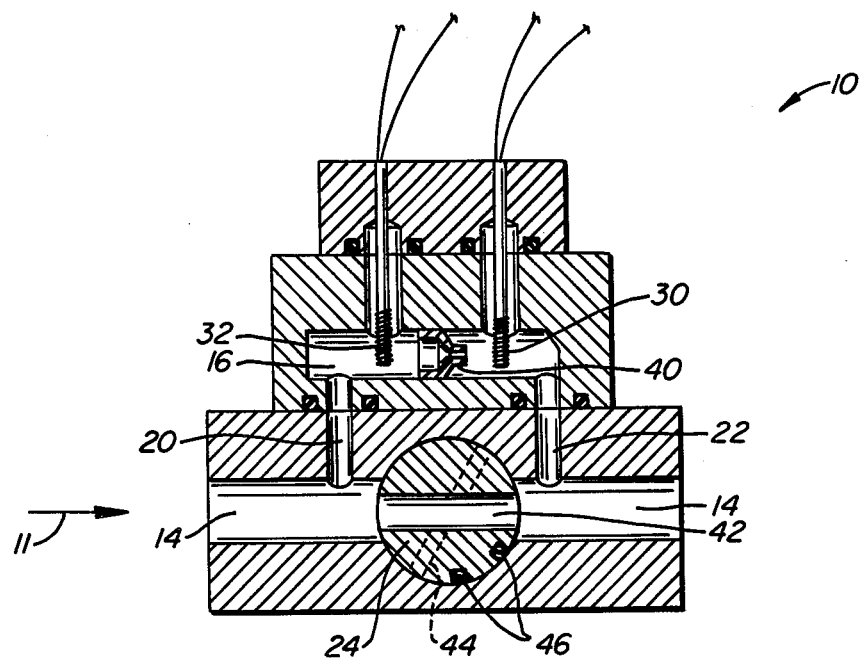
FIG.—1.

MULTIRANGE FLOWMETER

BACKGROUND OF THE INVENTION

This invention relates to a multi-range gas flowmeter. Conventional multi-range flowmeters measure the gas flow by sensing parameters of the flow in the main flow path. U.S. Pat. No. 3,321,970 to Walker, and U.S. Pat. No. 3,037,384 to Good, which are directed to flowmeters which measure the flow rate by sensing a pressure differential across an orifice, disclose devices which place different sized orifices in the main flow path to accommodate different ranges of flow rate.

Other types of flowmeters, such as those which sense the change in temperature of the flowing gas caused by the addition of a fixed amount of heat, utilize a bypass or secondary flow path for the measurement of the flow rate. Because such a flowmeter, as described in U.S. Pat. No. 3,851,526 to Drexel, diverts only a relatively minor portion of the flow through the secondary path, the accuracy of the flowmeter degrades at very low flow rates.

SUMMARY OF THE INVENTION

The present invention is directed to a multi-range gas flowmeter which includes two passages for the flow of the gas, a primary passage and a secondary passage which is connected at its inlet and outlet ends to the primary passage. The portion of the flowmeter which acts as the flow sensing device, which can be of generally any type including those sensing heat flux or pressure differential across an orifice, is located in the secondary passage of the flowmeter. A valve is located within the primary passage, between the inlet and outlet ends of the secondary passage, and is used to divert all or a portion of the gas flow from the primary passage through the secondary passage. With this type of flowmeter, all or a portion of the flow to be measured can be diverted through the passage containing the flow measuring device, thereby improving the accuracy of the flowmeter over various ranges of flow rate.

For a fuller understanding of the nature and advantages of the invention, reference should be made to the ensuing detailed description taken into conjunction with the accompanying drawing.

BRIEF DESCRIPTION OF THE DRAWING

The FIGURE is a sectional view of the flowmeter.

DESCRIPTION OF THE PREFERRED EMBODIMENTS

Referring to FIG. 1, the flowmeter 10 contains a primary flow passage 14, a secondary flow passage 16 which communicates with the primary passage 14 at its inlet end 20 and outlet end 22, a valve 24 for diverting the flow from the primary passage to the secondary passage, and means for measuring the flow of the gas through the secondary passage.

In the embodiment shown in FIG. 1, the flow measuring device located in the secondary passage 16 comprises a pair of conventional resistance temperature detectors 30 and 32 of different thermal masses. The resistance temperature detectors are connected to a bridge circuit (not shown) which maintains the temperature of detector 30 at a fixed level above the temperature of detector 32 during the flow measurement process. Detector 32 thus acts as a "sensor" of the temperature of the gas flowing past it. The cooling effect of the gas flowing past detector 30 causes an electrical power loss through detector 30 and a corresponding drop in current through detector 30. The amount of current required to maintain the temperature of detector 30 at a fixed amount above the temperature of detector 32 is proportional to the velocity of the gas flowing past detector 30. The bridge circuit (not shown) is temperature compensated by selecting resistances for each of the elements of the bridge so that for the same air velocity over a wide range of temperatures the same amount of current is drawn by detector 30 to maintain it at the fixed level above the temperature sensed by detector 32.

Located between detectors 32 and 30 is a nozzle 40. The nozzle 40 increases the local velocity of the gas past detector 30. This is advantageous since the accuracy of detector 30 increases when the velocity of the gas flow is above some minimum value where the natural convection of heat becomes negligible. Also, the nozzle 40 causes the flow downstream to have a flatter, more uniform velocity profile, which provides more accurate totalization of flow in passage 16. The diameter of nozzle 24 and the ratio of its diameter to the diameters of the nozzles in valve 24 is selected based upon the maximum and minimum flow rates desired to be measured by the flowmeter for each of its ranges.

The valve 24, which is located in the primary passage 14, includes two orifices of different diameter, each of which is a diameter less than the diameter of primary passage 14. The valve 24 is a cylinder located within the primary passage 14 with two separate bores spaced from one another along the axis of the cylinder and oriented at an angle with one another. Valve 24 can be rotated so that either of the orifices 42, 44 defined by the bores is aligned with primary passage 14, or so that the entire flow through primary passage 14 is blocked and diverted through the secondary passage 16. Valve 24 includes a seal 46, which can be of any suitable material such as Teflon, for preventing any flow past valve 24 and through passage 16 when the valve 24 is in the position for blocking all of the flow through the primary passage 14. Since each of the orifices 42, 44 in valve 24 has a diameter less than the diameter of primary passage 14, each orifice serves as a restriction to the primary flow through passage 14 creating a pressure drop between the inlet end 20 and the outlet end 22 of secondary passage 16. This insures that a fraction of the flow will be diverted through secondary passage 16. The ratio of the gas flow through secondary passage 16 to that through primary passage 14 when one of the orifices of valve 24 is in alignment with primary passage 14 is generally proportional to the ratio of the cross-sectional area of nozzle 40 to the cross-sectional area of the respective orifice 42 or 44 in use. This flow ratio is highly repeatable over a wide range of flow rates.

In operation the flow to be measured enters flowmeter 10, in the direction shown by arrow 11, through primary passage 14. If the flow is at a relatively high flow rate, valve 24 is rotated so that orifice 42 defined by the bore through valve 24 is aligned with the central bore defining the primary passage 14, as illustrated in FIG. 1. In this manner, a large portion of the total flow passes through primary passage 14 with only a relatively minor amount of the flow passing through secondary passage 16 where the flow measuring device is located. The ratio of the flow rates through the two passages is proportional to the ratio of the areas of the orifices in the two passages, specifically nozzle 40 and orifice 42. Thus, when a relatively high flow rate is being measured, resistance temperature detector 30 measures the flow rate through the secondary passage 16 in the manner described above. From this measurement, the total flow rate can be computed based upon the area ratio. To insure more precision in the measurement of the total flow rate, the flowmeter is calibrated over the entire range of flow rates from known calibration standards.

When a relatively low rate of flow must be measured, valve 24 is rotated so that all of the flow is diverted from the primary passage 14 to the secondary passage 16. In a like manner, when an intermediate rate of flow must be measured, valve 24 is rotated so that orifice 44 in valve 24 is aligned with the primary passage 14. It should thus be apparent that valve 24 may be utilized in the manner described above to insure that even though the total flow rates to be measured may vary over a wide range, the flow rate through the secondary passage 16 can be maintained over a relatively narrow range. Thus, regardless of the actual flow rate through the flowmeter 10, the velocity of the gas exiting nozzle 40 does not vary over a wide range. Since the calibration curve of current draw of resistance detector 30 versus the velocity of gas exiting nozzle 40 is a non-linear function, the maintenance of the velocity of gas exiting nozzle 40 over an optimum range of sensitivity and repeatability improves the accuracy of measurement.

Any one of a number of conventional displays can be used to provide the output of resistance detector 30, including the use of conventional circuitry to provide a digital display or conventional analog electrical meters. Also, conventional circuitry can be used to provide a linear output signal.

While the embodiment shown in FIG. 1 illustrates a multi-range flowmeter with a resistance temperature detector as the flow measuring device, it should be apparent that other types of conventional flow measuring devices located within secondary passage 16 would function equally as well. For example, the resistance temperature detectors 32 and 30 could be replaced by static pressure sensing devices which would sense a pressure drop across the restriction caused by orifice 40.

In another embodiment, a conduit could be used to define the secondary passage 16 and two resistance coils could be wrapped around the conduit. A third coil would be placed between the two coils and would be used to apply a fixed amount of heat to the flowing gas. When this type of flow measuring device is used, a nozzle or other flow restrictor is not used in the secondary passage. The flow is maintained laminar through the secondary passage by properly selecting the diameter and length of the secondary passage. This type of flow measuring device is more fully described in U.S. Pat. No. 2,727,976 to Laub. When this type of flow measuring device is utilized it may be desirable to use a laminar flow element in the primary passage, such as described in U.S. Pat. No. 3,792,609 to Blair. A modification of this type of flow measuring device uses two heat supplying coils wrapped around the conduit and measures the temperature differential of the coils, which is directly proportional to the mass flow of the fluid. This type of device is described in U.S. Pat. No. 3,938,384 to Blair.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A dual-range flowmeter for measuring the mass flow rate of a gas comprising:
    a housing having a central bore therethrough defining a primary passage for the gas and at least one secondary bore defining a secondary passage of lesser diameter communicating at its ends with the primary passage;
    a sensor located within the secondary passage for measuring the rate of mass flow of gas through the secondary passage, said sensor including a resistance temperature detector immersed in the flow in the secondary passage, means for maintaining the resistance temperature detector at a generally constant temperature differential above the temperature of the flowing gas and means coupled to the resistance temperature detector for sensing the electrical power loss of the resistance temperature detector caused by the cooling effect of the flowing gas;
    a nozzle located within the secondary passage for increasing the velocity of the gas flowing past the resistance temperature detector; and
    a valve located within the central bore between the locations where the ends of the secondary passage communicate with the primary passage, said valve being cylindrically shaped, rotatable about an axis generally perpendicular to the longitudinal axis of the central bore, and having a bore oriented generally perpendicular to the longitudinal axis of the cylindrically shaped valve, whereby when the valve is rotated so that the bore through the valve is aligned with the primary passage gas flows through the primary passage and when the valve is rotated so that the bore through the value is not aligned with the primary passage all of the gas flows through the secondary passage.

* * * * *